United States Patent [19]
Murakami

[11] Patent Number: 6,069,449
[45] Date of Patent: May 30, 2000

[54] BACKLIGHT CONTROL DEVICE FOR AN LCD

[75] Inventor: Isao Murakami, Tokyo, Japan

[73] Assignee: NEC Corporation, Tokyo, Japan

[21] Appl. No.: 09/288,717

[22] Filed: Apr. 9, 1999

[30] Foreign Application Priority Data

Apr. 9, 1998 [JP] Japan .................................. 10-097069

[51] Int. Cl.[7] .................................................. H05B 37/02
[52] U.S. Cl. .......................... 315/158; 320/106; 345/102
[58] Field of Search ......................... 315/158, 86, 169.3; 320/106, 135, 136; 345/102, 63, 204; 349/61

[56] References Cited

U.S. PATENT DOCUMENTS

| | | | |
|---|---|---|---|
| 5,272,327 | 12/1993 | Mitchell et al. | 315/158 |
| 5,440,208 | 8/1995 | Uskali et al. | 315/169.3 |
| 5,493,685 | 2/1996 | Zenda | 364/707 |
| 5,636,041 | 6/1997 | Pearce et al. | 345/102 |
| 5,760,760 | 6/1998 | Helms | 345/102 |
| 5,786,801 | 7/1998 | Ichise | 345/102 |
| 5,814,972 | 9/1998 | Shimada et al. | 320/135 |
| 5,818,172 | 10/1998 | Lee | 315/86 |
| 5,854,617 | 12/1998 | Lee et al. | 345/102 |
| 5,952,992 | 9/1999 | Helms | 349/61 |
| 5,963,010 | 10/1999 | Hayashi et al. | 320/106 |

FOREIGN PATENT DOCUMENTS

| | | |
|---|---|---|
| 64-32777 | 2/1989 | Japan . |
| 5-135893 | 6/1993 | Japan . |
| 8-122741 | 5/1996 | Japan . |
| 9-288262 | 11/1997 | Japan . |

Primary Examiner—Thuy Vinh Tran
Attorney, Agent, or Firm—Foley & Lardner

[57] ABSTRACT

A device applicable to a digital still camera or similar handy apparatus for controlling the brightness of a backlight used to backlight an LCD (Liquid Crystal Display) panel is disclosed. Power to be fed from a battery to the backlight and therefore the brightness of the backlight is increased on the basis of the temperature of the backlight and the kind and remaining power of the battery. The device prevents the brightness of the LCD panel from falling even in a low temperature environment and thereby implements easy-to-see image display little effected by temperature.

10 Claims, 6 Drawing Sheets

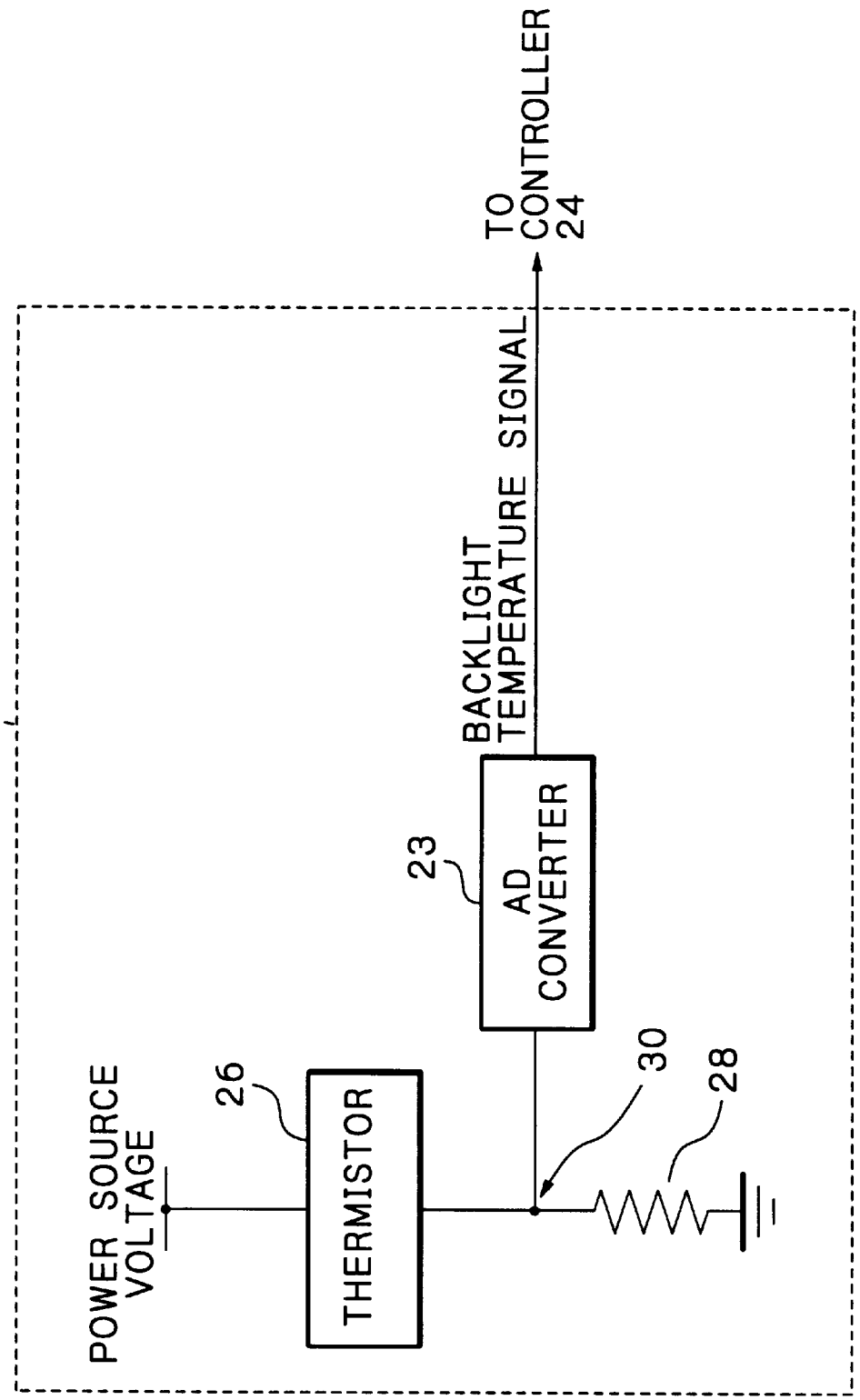

BACKLIGHT CONTROL DEVICE FOR AN LCD

BACKGROUND OF THE INVENTION

The present invention relates to an LCD (Liquid Crystal Display) advantageously applicable to a digital still camera or similar handy apparatus and more particularly to a device for controlling the brightness of a backlight used to backlight an LCD.

An LCD with an backlight includes a LCD panel to be illuminated by the backlight from the back. Light output from the backlight and transmitted through the LCD panel is recognized as an image. This kind of LCD panel has contrast high enough to allow a person to clearly see an image appearing thereon even in a dark place.

The backlight is implemented by a fluorescent tube which is either a flat fluorescent tube or a sidelight tube. The sidelight tube is a combination of a reflector and a tubular fluorescent tube and feasible for the miniaturization of handy apparatuses with LCDs.

However, the problem with the sidelight tube is that its brightness falls when surrounding temperature falls. It follows that a digital still camera or similar handy apparatus with an LCD panel illuminated by a sidelight tube causes the brightness of the sidelight to fall when the apparatus is used outdoor or at temperatures lower than room temperature. This renders an image appearing on the LCD panel difficult to see.

Technologies relating to the present invention are disclosed in, e.g., Japanese Patent Laid-Open Publication Nos. 64-32777, 5-135893, 8-122741 and 9-288262.

SUMMARY OF THE INVENTION

It is therefore an object of the present invention to provide a backlight control device for an LCD capable of preventing the brightness of a backlight from falling even in a low temperature environment and thereby insuring easy-to-see image display.

A device for controlling the brightness of a backlight used to backlight an LCD panel of the present invention includes a backlight temperature sensing section for measuring the temperature of the backlight to thereby output a backlight temperature signal. A kind-of-battery detecting section detects the kind of a battery used to feed power to the backlight to thereby output a kind-of-battery signal. A remaining battery power detecting section detects the remaining power of the battery to thereby output a remaining battery power signal. A backlight section controls power to be fed to the backlight. A controller delivers to the backlight section a signal for increasing the power to be fed to the backlight only if backlight temperature represented by the backlight temperature signal is above a preselected reference temperature, if the kind of the battery represented by the kind-of-battery signal is a specific kind, and if the remaining battery power represented by the remaining battery power signal is above a preselected reference power.

Also, a method of controlling the brightness of a backlight used to backlight an LCD panel includes the steps of measuring the temperature of the backlight, detecting the kind of a battery used to feed power to the backlight, detecting the remaining power of the battery, and increasing the power to be fed to the backlight only if backlight temperature is above a preselected reference temperature, if the kind of the battery is a specific kind, and if the remaining battery power is above a preselected reference power.

BRIEF DESCRIPTION OF THE DRAWINGS

The above and other objects, features and advantages of the present invention will become more apparent from the following detailed description taken with the accompanying drawings in which:

FIG. 3 is a schematic block diagram showing a specific configuration of a backlight temperature sensing section included in the illustrative embodiment;

DESCRIPTION OF THE PREFERRED EMBODIMENT

Figure 1:
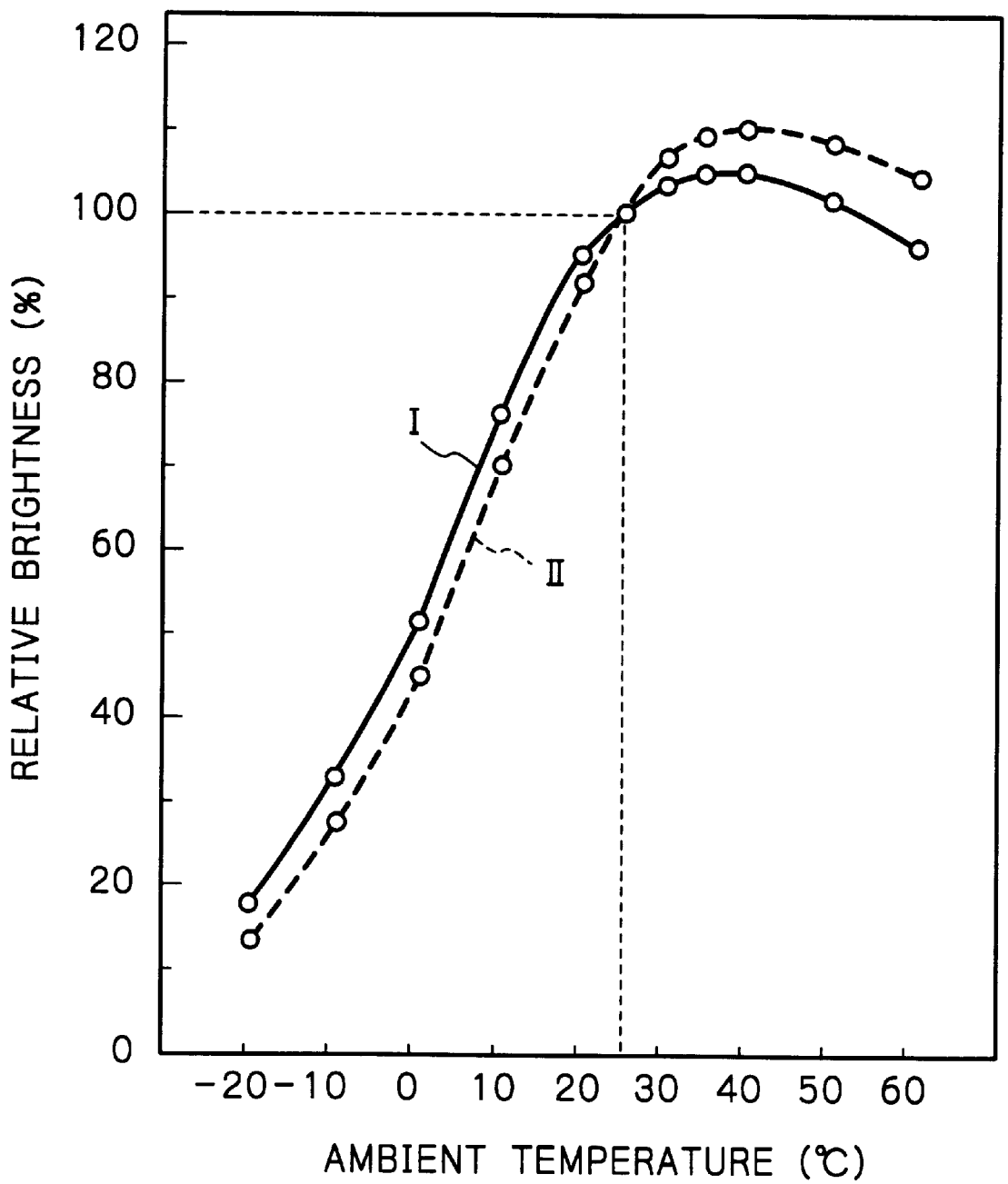
FIG. 1 is a graph showing a relation between the brightness of a sidelight tube usable as a backlight and temperature around it.

To better understand the present invention, reference will be made to FIG. 1 for describing a relation between the brightness of a sidelight tube and temperature around it. In FIG. 1, the ordinate and abscissa respectively indicate the relative brightness (%) of a sidelight tube and temperature (° C.) around the sidelight tube. The relative brightness is assumed to be 100% at room temperature (25° C.). A curve I is representative of brightness measured when the backlight was driven by a current of 5 mA. A curve II is representative of brightness measured when the drive current was 5 mA.

The sidelight tube is implemented by a cold cathode discharge lamp. Therefore, the surface temperature of the sidelight tube can be considered to be substantially identical with the surrounding temperature. As the curves I and II indicate, the brightness of the sidelight tube decreases with a decrease in surrounding temperature at temperatures below 40° C. For example, when the surrounding temperature is 10° C., the brightness is lower than when it is 25° C. by about 50%.

Conventional LCDs using the above sidelight tube give no consideration to the fall of brightness at low temperatures, as discussed earlier. This makes it difficult to see images appearing on the LCDs.

Referring to FIG. 1, a backlight control device embodying the present invention is shown and applied to a digital still camera by way of example. As shown, the control device, generally 100, controls the brightness of a backlight 10 used to illuminate an LCD panel. The control device includes a backlight temperature sensing 12, a battery unit 20, a backlight section 22 including the backlight 10, and a controller 24. The battery unit 20 has a kind-of-battery detection 16 and a remaining battery power detection 18. The controller 24 implemented as a CPU (Central Processing Unit).

The backlight temperature sensing 12 senses the temperature of the backlight 10. As shown in FIG. 3 specifically, the sensing 12 includes a thermistor 26, a resistor 28, and an AD (Analog-to-Digital) converter 23. The thermistor 26 is connected to a power source voltage at one end and serially connected to one end of the resistor 28 at the other end. The other end of the resistor 28 is connected to ground.

A node 30 between the thermistor 26 and the resistor 28 is connected to the AD converter 23. The AD converter 23 converts a voltage appearing on the node 30 to a digital value and delivers it to the controller 24 as a backlight temperature signal.

The kind-of-battery detection 16 detects the kind of a battery 14 for feeding power to the backlight 10. Batteries are generally classified into two kinds, i.e., a specific kind capable of feeding great power and a nonspecific kind incapable of feeding great power. The specific kind of battery may be a lithium ion battery, nickel-hydrogen battery or a nickel-cadmium battery by way of example. The nonspecific kind of battery may be an alkaline battery by way of example.

Figure 4A:
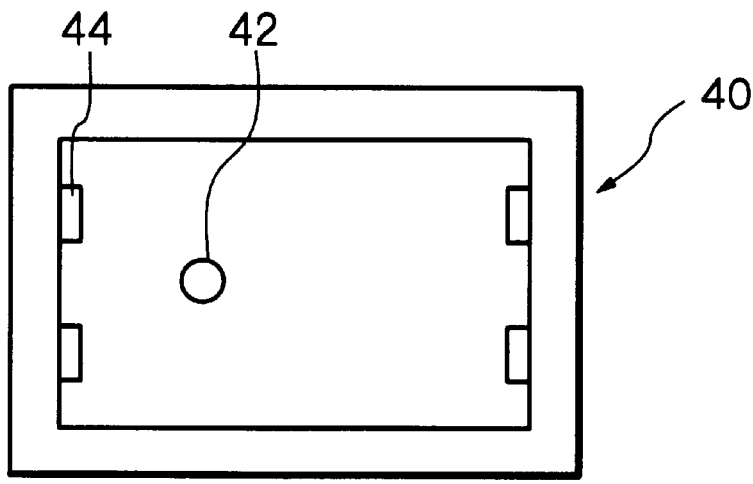
FIG. 4A is a top plan view showing a battery box also included in the illustrative embodiment.
Figure 4B:
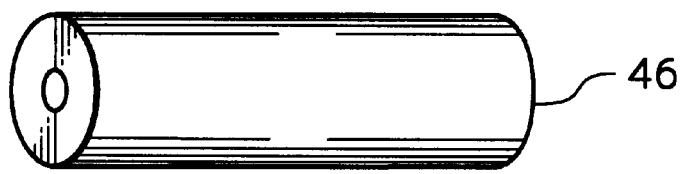
FIGS. 4B and 4C are perspective views respectively showing a cylindrical dry battery and a noncylindrical dry battery selectively accommodated in the battery box.
Figure 4C:
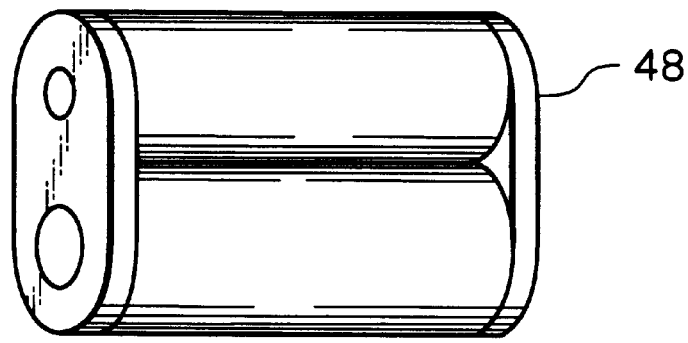

FIG. 4B shows a cylindrical dry battery 46 typifying the nonspecific kind of battery while FIG. 4C shows a noncylindrical dry battery 48 typifying the specific kind of battery. In the illustrative embodiment, the kind-of-battery detection 16 determines the kind of the battery 14 on the basis of the shape of the battery 14.

Figure 2:
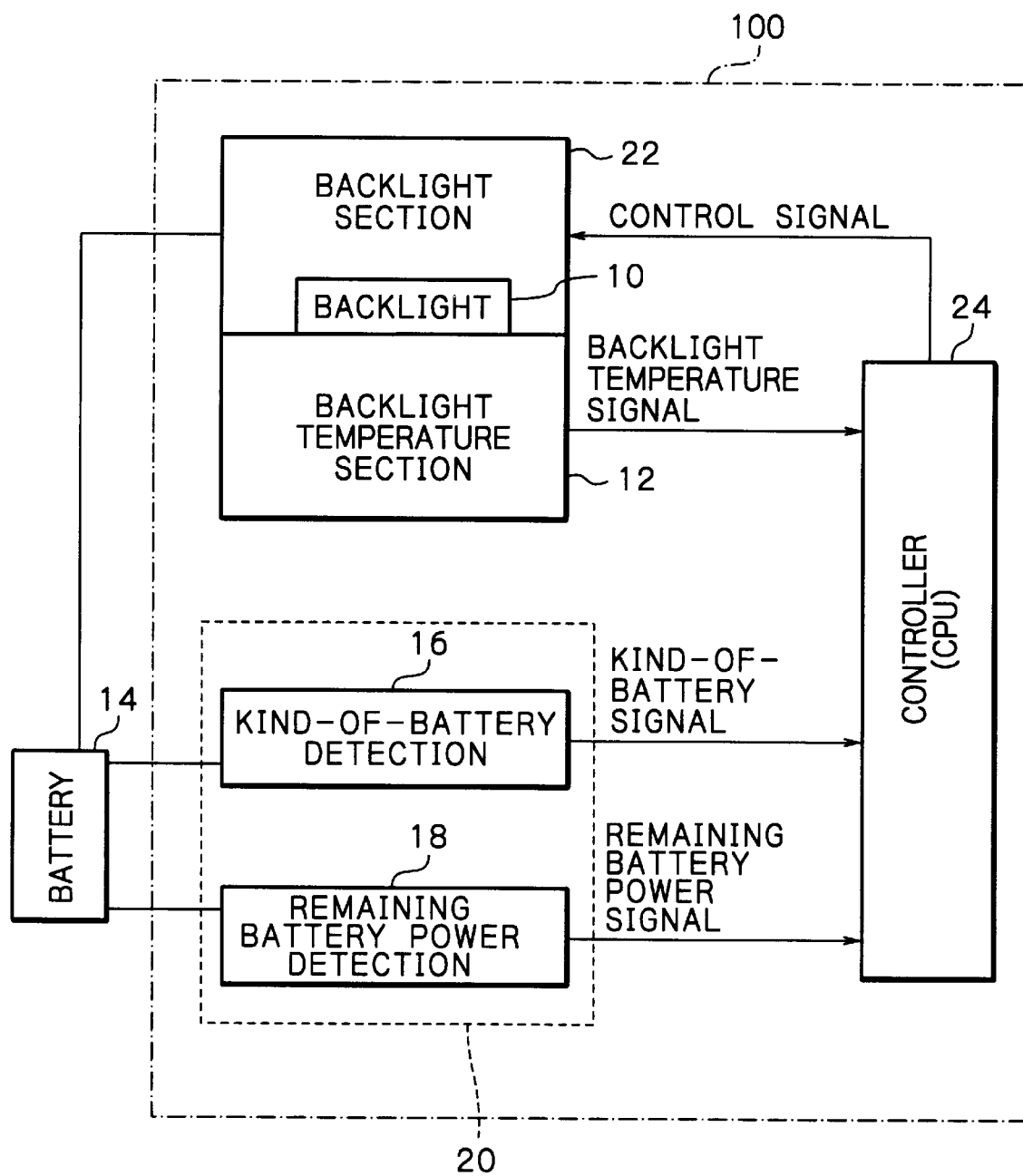
FIG. 2 is a block diagram schematically showing a backlight control device embodying the present invention.

FIG. 4A shows a battery box 40 playing the role of means for determining the shape of the battery 14. The battery box 40 includes electrodes 44 so arranged as to accommodate either two cylindrical dry batteries 46 or a single noncylindrical dry battery 48, as desired. A push-button switch 42 is positioned on the bottom of the inside of the battery box 40 such that the noncylindrical dry battery 48 contacts it, but the cylindrical dry batteries 46 do not contact it. That is, the battery 48 pushes the switch 42, but the batteries 46 do not push it. The kind-of-battery detection 16 sends a kind-of-battery signal representative of the kind of the battery 14, FIG. 2, to the controller 24.

The remaining battery power detection 18 detects the remaining power of the battery 14 and sends a remaining battery power signal to the controller 24. To detect the remaining power of the battery 14, there may be used a conventional method proposed by battery manufacturers. In accordance with the proposed method, a microprocessor, not shown, is included in the remaining battery power detection 18 in order to constantly monitor the varying voltage and the current of the battery 14 as well as temperature.

Figure 6:
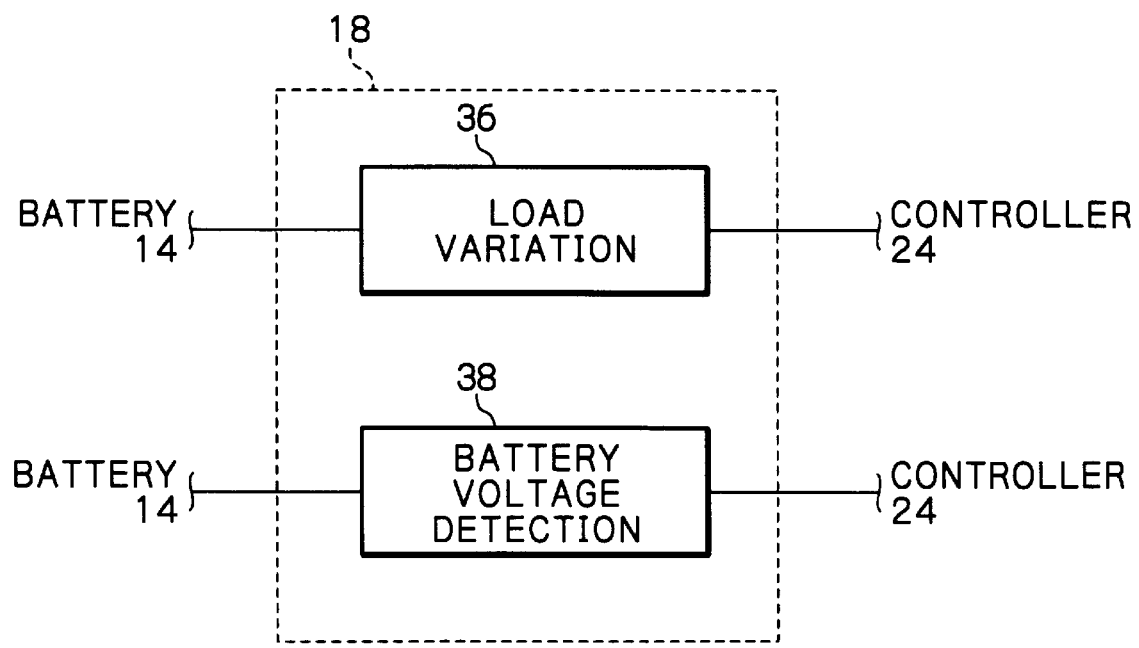
FIG. 6 is a schematic block diagram showing a specific configuration of a remaining battery power detecting section additionally included in the illustrative embodiment.

Alternatively, a load acting on the battery 14 may be varied in order to measure the drop of battery voltage with respect to time when the power to be fed from the battery 14 is increased. FIG. 6 shows a specific arrangement for practicing such an alternative scheme. As shown, a load variation 26 increases the power to be fed from the battery 14 for a moment. A voltage detection 38 measures the drop of battery voltage with respect to time when the power is so increased by the load variation 26.

Figure 5:
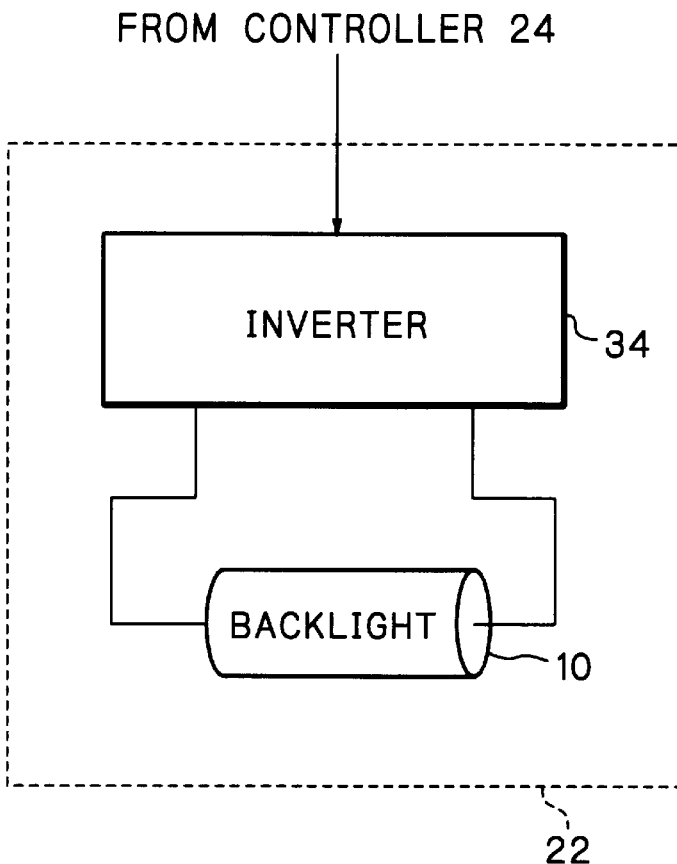
FIG. 5 is a schematic block diagram showing a specific configuration of a backlight section further included in the illustrative embodiment.

FIG. 5 shows a specific configuration of the backlight section 22. As shown, the backlight section 22 includes the backlight 10 and an inverter 34 for feeding power to the backlight 10. The backlight section 22 is capable of controlling power to be fed to the backlight 8 on the basis of the ON time of a pulse output from the inverter 34. Specifically, in response to a control signal, the backlight section 22 increases the ON time of the output pulse of the inverter 34 and therefore the power to be fed to the backlight 8. As a result, the brightness of the backlight 10 increases.

The backlight temperature signal, kind-of-battery signal and remaining battery power signal are input to the controller 24. The controller 24 sends the above control signal to the backlight section 22 for increasing the power to be fed to the backlight 10 above the ordinary power only if the following three different conditions (1)–(3) are satisfied:

(1) the temperature of the backlight 10 is lower than a preselected reference temperature;

(2) the battery 14 is of the specific kind stated earlier; and (3) the remaining power of the battery 14 is lower than a preselected reference value.

The power to be fed to the battery 14 should preferably be varied in multiple steps in accordance with temperature and the kind and life of the battery 14. It is preferable to increase the power up to one which is about two times as high as the ordinary power. For example, when the usual power is 0.6 W to 1.0 W, it should preferably be increased to up to about 2 W. Further, the reference temperature and reference remaining battery power should preferably be determined beforehand.

Figure 7:
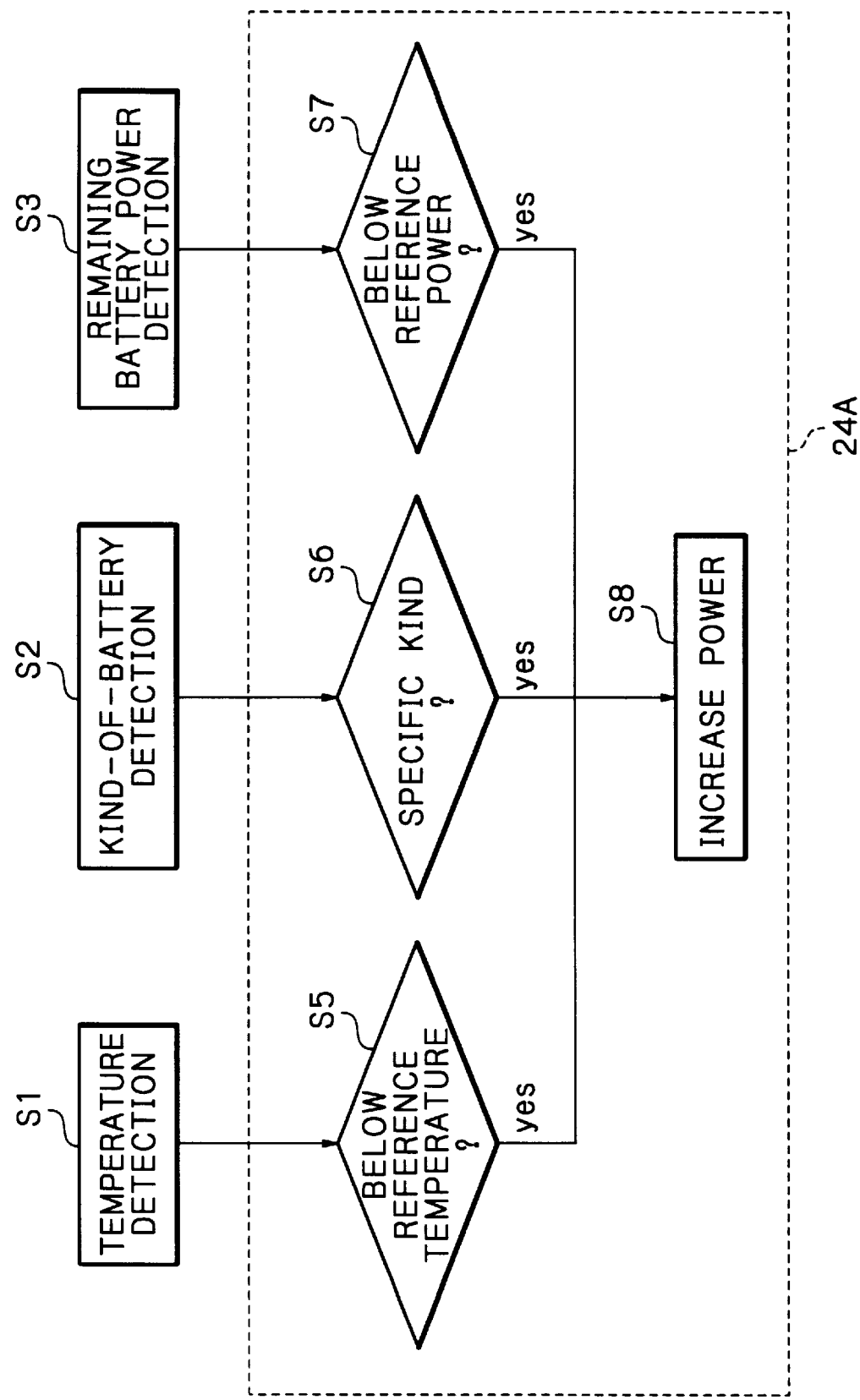
FIG. 7 is a flowchart demonstrating a specific operation of the illustrative embodiment.

A specific operation of the backlight control device 100, i.e., the controller 24 will be described with reference to FIG. 7. As shown, the controller 24 determines the temperature of the backlight 10 on the basis of the backlight temperature signal received from the backlight temperature detection 12 (step S1). At the same time, the controller 24 determines the kind of the battery 14 on the basis of the kind-of-battery signal received from the kind-of-battery detection 16 (step S2). Further, the controller 24 determines power remaining in the battery 14 by referencing the remaining battery power signal received from the remaining battery power detection 18 (step S3).

Subsequently, the controller 24 executes a control procedure collectively labeled 24A in FIG. 7. Specifically, the controller 24 compares the temperature represented by the backlight temperature signal with the reference temperature (step S5). Also, the controller 24 determines whether or not the kind-of-battery signal indicates that the battery 14 is of the specific kind (step S6). Further, the controller 24 compares the power indicated by the remaining battery power signal and the reference power (step S7). Only if the backlight temperature is below the reference temperature, if the battery 14 is of the specific kind, and if the remaining power of the battery 14 is above the reference power, then the controller 24 delivers to the inverter 34 of the backlight section 22 the control signal for increasing the power to be fed to the backlight 10. In response, the inverter 34 increases the ON time of its output pulses and therefore the power to be fed to the backlight 10. Consequently, the brightness of the backlight 8 increases (step S8).

With the above control procedure, the illustrative embodiment realizes easy-to-see image display with a minimum of fall of brightness even in a low-temperature environment.

Various modifications will become possible for those skilled in the art after receiving the teachings of the present disclosure without departing from the scope thereof. For example, the battery 14 may feed power not only to the backlight 10 but also to any other section included in the digital still camera. Of course, the present invention is applicable to various kinds of portable apparatuses including the digital still camera. In addition, the battery 14 is not limited to a dry battery shown and described.

In summary, it will be seen that the present invention provides a backlight control device for an LCD capable of preventing the brightness of the LCD from falling even at low temperatures and thereby implementing easy-to-see image display little dependent on temperature. This advantage is derived from a unique arrangement in which power to be fed from a battery to a backlight and therefore the brightness of the backlight is increased on the basis of the temperature of the backlight and the kind and remaining power of a battery.

What is claimed is:

1. A device for controlling brightness of a backlight used to backlight an LCD panel, comprising:

a backlight temperature sensing section for measuring a temperature of the backlight to thereby output a backlight temperature signal;

a kind-of-battery detecting section for detecting a kind of a battery used to feed power to the backlight to thereby output a kind-of-battery signal;

a remaining battery power detecting section for detecting a remaining power of the battery to thereby output a remaining battery power signal;

a backlight section for controlling a power to be fed to the backlight; and a controller for delivering to said backlight section a signal for increasing the power to be fed to the backlight only if a backlight temperature represented by said backlight temperature signal is above a preselected reference temperature, if a kind of the battery represented by said kind-of-battery signal is a specific kind, and if a remaining battery power represented by said remaining battery power signal is above a preselected reference power.

2. A device as claimed in claim 1, wherein said controller varies the power to be fed to the backlight stepwise.

3. A device as claimed in claim 2, wherein said kind-of-battery detecting section determines the kind of the battery on the basis of a shape of said battery.

4. A device as claimed in claim 3, wherein said kind-of-battery detecting section comprises:

a battery box capable of accommodating desired one of two cylindrical dry batteries and a single noncylindrical dry battery; and a push-button switch mounted on said battery box such that the single noncylindrical battery will contact said push-button switch, but the two cylindrical batteries will not contact said push-button switch.

5. A device as claimed in claim 4, wherein said remaining battery power detecting section comprises:

a load varying section for increasing the power to be fed from the battery for a moment; and a voltage detecting section for detecting a drop of a voltage of the battery when the power is increased by said load varying section.

6. A device as claimed in claim 5, wherein said backlight section increases, in response to a control signal output from said controller, an ON time of a pulse output from an inverter used to control the brightness of the backlight.

7. A device as claimed in claim 1, wherein said kind-of-battery detecting section determines the kind of the battery on the basis of a shape of said battery.

8. A device as claimed in claim 1, wherein said remaining power detecting section comprises:

a load varying section for increasing the power to be fed from the battery for a moment; and a voltage detecting section for detecting a drop of a voltage of the battery when the power is increased by said load varying section.

9. A device as claimed in claim 1, wherein said backlight section increases, in response to a control signal output from said controller, an ON time of a pulse output from an inverter used to control the brightness of the backlight.

10. A method of controlling brightness of a backlight used to backlight an LCD panel, comprising the steps of:

measuring a temperature of the backlight;

detecting a kind of a battery used to feed power to the backlight;

detecting a remaining power of the battery; and increasing the power to be fed to the backlight only if a backlight temperature is above a preselected reference temperature, if a kind of the battery is a specific kind, and if a remaining battery power is above a preselected reference power.

* * * * *